United States Patent
Shows et al.

(10) Patent No.: US 10,437,646 B2
(45) Date of Patent: Oct. 8, 2019

(54) AUTOMATIC DETECTION OF OPTIMAL COMPUTE UNIT PARTITIONING

(71) Applicant: Dell Products L.P., Round Rock, TX (US)

(72) Inventors: Thomas Alexander Shows, Cedar Park, TX (US); Charles G. Morton, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 15/430,657

(22) Filed: Feb. 13, 2017

(65) Prior Publication Data
US 2018/0232260 A1   Aug. 16, 2018

(51) Int. Cl.
*G06F 9/46* (2006.01)
*G06F 9/50* (2006.01)

(52) U.S. Cl.
CPC ...... *G06F 9/5061* (2013.01); *G06F 2209/501* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 8,381,215 B2* | 2/2013 | Johnson | G06F 1/3203 713/300 |
| 8,683,240 B2* | 3/2014 | Burns | G06F 1/26 713/300 |
| 2009/0150893 A1* | 6/2009 | Johnson | G06F 9/5088 718/104 |
| 2012/0198461 A1* | 8/2012 | Saxe | G06F 9/5027 718/103 |
| 2015/0007187 A1* | 1/2015 | Shows | G06F 9/5088 718/104 |
| 2015/0277922 A1* | 10/2015 | Bartik | G06F 9/3851 712/215 |
| 2015/0301864 A1* | 10/2015 | Tseng | G06F 9/5011 718/104 |
| 2016/0246647 A1* | 8/2016 | Harris | G06F 9/4856 |

OTHER PUBLICATIONS

Dell, Dell Precision Optimizer, 2015 http://i.dell.com/sites/doccontent/shared-content/data-sheets/en/Documents/Dell-Precision-Optimizer-spec-Sheet.pdf.
HP, HP Performance Advisor, Data Sheet, 2010-2014 http://h20195.www2.hp.com/V2/GetPDF.aspx/4AA1-8702ENW.pdf.
Lenovo, Lenovo Performance Tuner, printed Feb. 7, 2017 http://support.lenovo.com/us/en/downloads/ds105193.

\* cited by examiner

*Primary Examiner* — Kenneth Tang
(74) *Attorney, Agent, or Firm* — Terrile, Cannatti & Chambers; Stephen A. Terrile

(57) ABSTRACT

A system, method, and computer-readable medium are disclosed for performing an automatic partition optimization operation on a processor, comprising: monitoring compute unit usage of the processor over time; determining whether an application executing on the processor comprises a lightly threaded application or a heavily threaded application; and, automatically adjusting compute unit partitioning of the processor based upon whether the application executing on the processor comprises the lightly threaded application or the heavily threaded application.

18 Claims, 9 Drawing Sheets

AUTOMATIC DETECTION OF OPTIMAL COMPUTE UNIT PARTITIONING

BACKGROUND OF THE INVENTION

Field of the Invention

The present invention relates to information handling systems. More specifically, embodiments of the invention relate to automatically monitoring and adjusting partitioning automatically, doing so intelligently with safeguards and programmable thresholds.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with one or more processors. It is also known to provide processors with a plurality of processor cores. For example, many known processors include a plurality of processor cores along with common resources shared by the plurality of processor cores. It is known to configure processors or processor cores as a plurality of logical processors, also known as compute units. For example, with a hyper threading operation, one processor core may be configured to have two logical processors. Configuring the processor core to have a plurality of logical processors involves performing a partition operation on the processor core. Techniques for determining how to partition the compute units often use prior knowledge of application names and their typical use cases.

SUMMARY OF THE INVENTION

A system, method, and computer-readable medium are disclosed for performing an automatic partition optimization operation on a processor comprising: monitoring compute unit usage of the processor over time; determining whether an application executing on the processor comprises a lightly threaded application or a heavily threaded application; and, automatically adjusting compute unit partitioning of the processor based upon whether the application executing on the processor comprises the lightly threaded application or the heavily threaded application.

The automatic partition optimization operation is performed intelligently with safeguards and programmable thresholds. Such an operation provides a benefit by adjusting processor compute unit partitioning based upon compute unit usage. For example, for lighter compute unit usage, the compute units may be partitioned to maximize performance by eliminating conflicts due to resource sharing. Also for example, for heavier compute unit usage, the compute units may be remained partitioned to maximize symmetric multiprocessing capabilities.

Aspect of the disclosure include an appreciation that optimal compute unit performance can require, among other things, making the best partitioning selection due to resource sharing (e.g. Hyper Threading). In various embodiments, the best partitioning selection takes into account the application executing on the processor and the use of available resources by the application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The prior art includes software such as Dell Precision Optimizer, HP's Performance Adviser, Lenovo's Performance Tuner, and various third party tools. The existing solutions use a priori knowledge of applications (and detection, like DPO today) and/or require the individual user or IT staff to know what setting is best for their applications and their usage models. That results in a couple of big problems: 1. One can't support/detect every application. It's difficult to characterize a single application, and we have over two dozen today, but to characterize every application and determine which setting is best is intractable; 2. Users use applications differently. While we can detect the name of a running application and respond to that, we might be wrong about how the application is being used, and this can harm performance (i.e., we need to know more than just the name—and the present invention is part of the automated analysis tools we're working on to know more about how the machine is being used).

What sets the present invention apart from prior art as novel is that it's a programmable algorithm taking into account historical trend analysis to determine the appropriate partitioning of compute units that are most likely to provide the best performance for how the machine has been used up to that point, rather than string matching names of running application against a lookup table.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
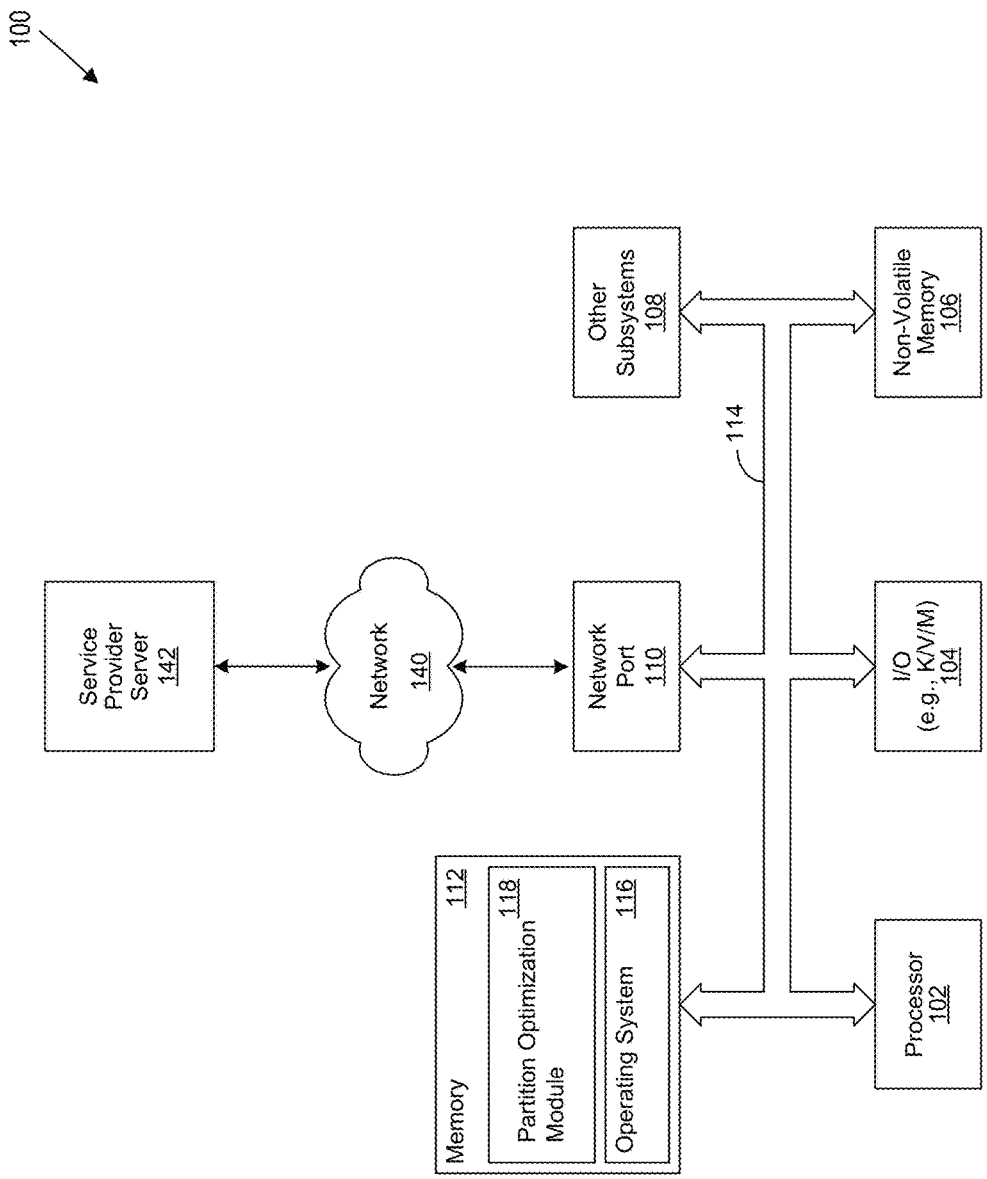
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a partition optimization module 118.

The partition optimization module 118 performs an automatic partition optimization operation. The automatic partition optimization operation is performed intelligently with safeguards and programmable thresholds. The automatic partition optimization operation improves processor efficiency by adjusting processor compute unit partitioning based upon compute unit usage. For example, for lighter compute unit usage, the compute units may be partitioned to maximize performance by eliminating conflicts due to resource sharing. Also for example, for heavier compute unit usage, the compute units may be partitioned to maximize symmetric multi-processing capabilities.

Figure 2:
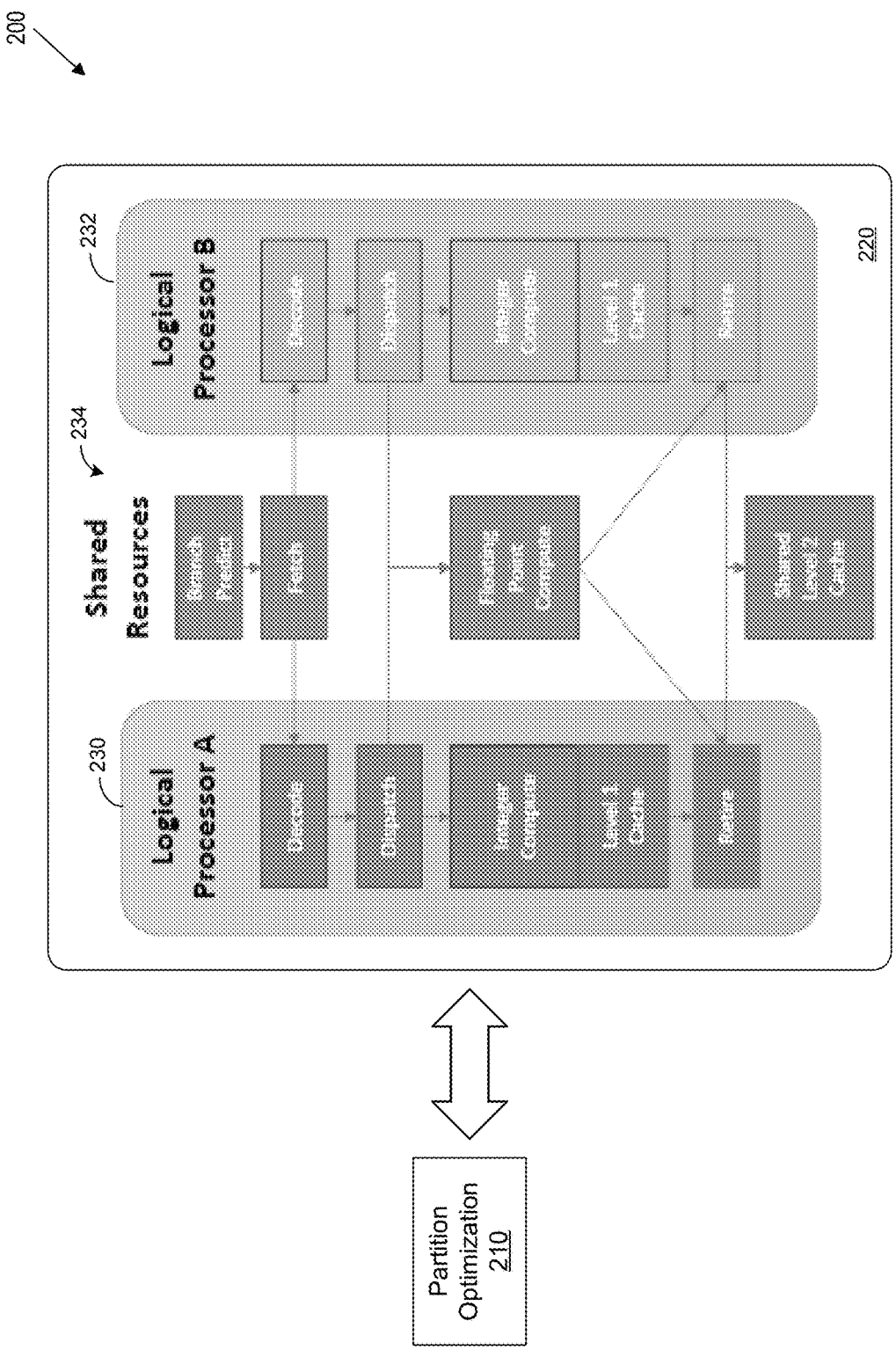
FIG. 2 shows a block diagram of partition optimization environment.

FIG. 2 shows a block diagram of partition optimization environment 200. The partition optimization environment 200 includes a partition optimization system 210 and a processor 220 (which may correspond to processor 102 in certain embodiments). In various embodiments, the processor 220 includes a plurality of logical processors 230, 232 (Logical Processor A and Logical Processor B), as well as shared resources 234. The partition optimization module 118 provides some or all of the functionality of the partition optimization system 210. In certain embodiments each of the logical processors 230, 232 may include one or more components such as a decode component, a dispatch component, an integer compute component, a level 1 cache component, and a retire component. In certain embodiments, the shared resources may include one or more components such as a branch predict component, a fetch component, a floating point compute component, and a shared cache component (e.g., a Level 2 cache).

With processors such as the processor 220, significant performance gains may be achieved via symmetric multiprocessing. For the purposes of this disclosure, symmetric multiprocessing may be defined as processing of programs by a plurality of processors (or a plurality of processor cores within the same processor) that share a common operating system and memory. Each processor or processor core may be configured to include a plurality of compute units sharing resources. In symmetric (also referred to as tightly coupled) multiprocessing, the processors (or processor cores) share processor resources as well as memory and the I/O bus or data path. A single copy of the operating system is in charge of all the processors (or processor cores).

With symmetric multiprocessing, it is desirable to minimize resource conflicts to maximize performance gains. For example, resource conflicts may be minimized where two threads are executing on the logical processor where only one or neither thread heavily uses the shared resources. With symmetric multiprocessing, performance can degrade if two threads make more extensive use of the shared resources. One method for minimizing this performance degradation is by shifting dissimilar threads away from one another (e.g., by skipping over logical processors when scheduling threads).

Figure 3:
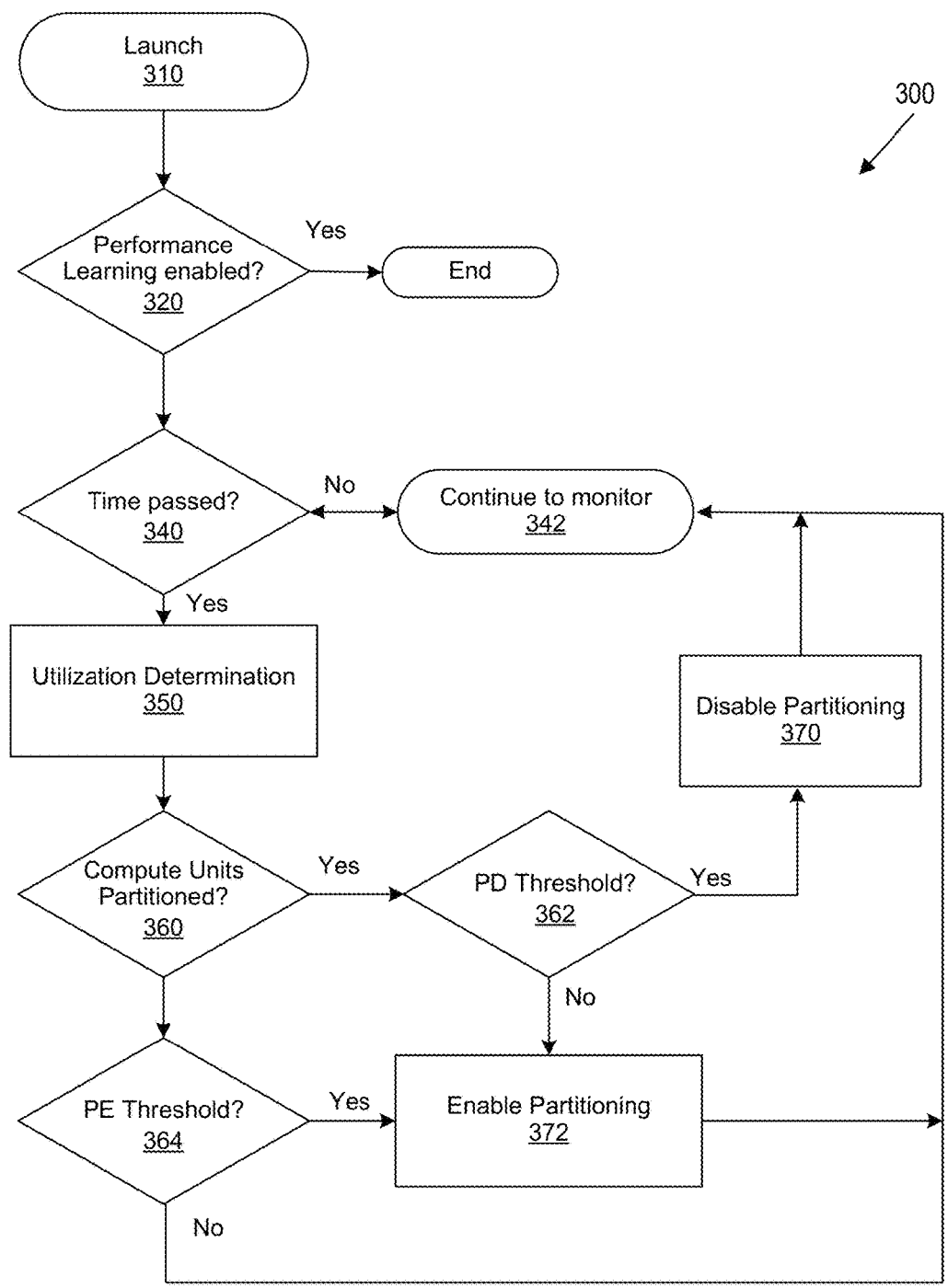
FIG. 3 shows a flow chart of the operation of a partition optimization operation.

FIG. 3 shows a flow chart of an automatic partition optimization operation 300. More specifically, the automatic partition optimization operation 300 begins at step 310 by launching monitoring software when the information handling system 100 is booted (i.e., when the information handling system is either turned on or restarted, the operating system is loaded and the information handling system 100 is prepared for use). Next, the partition optimization operation 300 determines whether a performance learning option is enabled at step 320. The automatic partition optimization system 210 includes an option of allowing a user to enable or disable the performance learning option because certain users may not want to have the software instrumentation overhead of monitoring processor utilization over time. When the performance learning operation is not enabled, then the partition optimization operation ends operation.

When the performance learning option is enabled, the partition optimization system 210 enters a decision portion 330 of the automatic partition operation 300. The decision portion 330 evaluates historical utilization data and determines whether or not to change the partitioning method for compute units (e.g. Hyper Threading enabled/disabled in System BIOS for CPUs which support this feature). More specifically, at step 340 the partition optimization system determines whether a predetermined amount of time (e.g., a certain number of days) has passed since the last change. In various embodiments, the predetermined amount of time is configurable. Determining whether a predetermined amount of time has passed provides a hysteresis function to the partition optimization operation, thus avoiding frequent or constant change to the partitioning setting.

If a sufficient amount of time has not passed, the partition optimization system 210 continues to monitor the compute units at step 342 but makes no change to the partitioning setting. When enough time has passed (as determined by step 342) then the partition optimization system 210 performs a utilization determination operation at step 350. More specifically, the utilization determination evaluates N-width intervals of time over a past M intervals to determine an average utilization of each of the compute units. In certain embodiments, N and M are programmable. In certain embodiments, N and M are user-configurable. For example, the utilization determination might evaluate the past 720 hours of average processor utilization per hour. For each hour, the utilization determination determines a utilization value. In certain embodiments, the utilization value is a value between 0 and 100 for the mean processor utilization. In certain embodiments, the utilization value is computed based on a programmable sampling rate of a set amount of time (e.g., every 5 seconds). The utilization determination then determines whether a certain number of intervals have utilization values which exceed a certain threshold value (X). In various embodiments, the threshold value is programmable. In certain embodiments, the threshold value is user-configurable.

Next, at step 360 the partition optimization system determines whether the compute units are presently partitioned. If so, then at step 362 the partition optimization system determines whether the average utilization is below a Partition Disable (PD) threshold. The PD threshold represents a utilization rate at which, if partitioning is enabled, it should be disabled. The PD threshold represents a lower limit such that any value lower than the threshold would result in partitioning being disabled when previously enabled. For example, if partitioning is enabled and the processor is partitioned to include eight logical processors and the average utilization rate is computed as 20%, where an example PD threshold is 50 (percent), then the portioning optimization operation would disable partitioning on a subsequent boot.

If the partition optimization system determines the compute units are not presently partitioned, then the partition optimization system determines whether a Partition Enable (PE) threshold of average utilization has been exceeded at step 364. The PE threshold represents a utilization rate at which, if partitioning is disabled, it should be enabled. The PE threshold represents an upper limit such that any value above the threshold would result in partitioning being enabled when previously disabled. For example, if partitioning is disabled and the average utilization rate is computed as 85%, where an example PE threshold is 80 (percent), then the portioning optimization operation would enable partitioning on a subsequent boot.

If the PD threshold of average utilization has been exceed, then at step 370 the partition optimization system ensures that partitioning is disabled for the next subsequent boot of the information handling system. In certain embodiments, partitioning is disabled by issuing a System Management Interrupt (SMI) to the BIOS of the information handling system to signal the change to partitioning. The system BIOS makes the partitioning change, but the effects do not actually have an effect until the next subsequent boot. In certain embodiments, partitioning may be disabled directly at the processor itself. If the PE threshold of average utilization has not been exceeded, then at step 372 the partition optimization system 210 ensures that partitioning is enabled on the next subsequent boot of the information handling system. In certain embodiments, partitioning is enabled by issuing a System Management Interrupt (SMI) to the BIOS of the information handling system to signal the change to partitioning. The system BIOS makes the partitioning change, but the effects do not actually have an effect until the next subsequent boot. In certain embodiments, partitioning may be enabled directly at the processor itself. Whether partitioning is disabled at step 370 or enabled at step 372, the operation returns to step 342 where the partition optimization system 210 continues to monitor the compute units.

In certain embodiments, the partition optimization system 210 may be configured to aggressively perform the partition optimization operation. More specifically, aggressively performing the partition optimization operation errs on the side of caution when determining whether to disable partitioning. Such an aggressive approach would likely avoid any potential downside of disabling partitioning. Such an aggressive approach might use a relatively long historical view (e.g., 30 days of logs) and relatively low criteria for exceeding the threshold (e.g., if at any time during that period the processor utilization in a one-hour window exceeded a threshold value of 50%) then consider partitioning valuable enough to be enabled.

In certain embodiments, the partition optimization system 210 may be configured to less aggressively perform the partition optimization operation. A less aggressive performance of the partition optimization operation could also be considered a more opportunistic use of the partition optimization operation. Such a less aggressive partition optimization operation would correspond to configuring the partitioning to provide a best possible lightly-threaded performance, even risking occasional periods of lower compute performance. Such a less aggressive partition optimization operation might use a relatively short historical time view (e.g., 10-20 hours of logs) and a relatively high criteria for exceeding the threshold (e.g., 4 or more excursions of processor utilization above a threshold value of 50%) in the relatively short historical time view. After the fourth excursion, the partition optimization system would enable partitioning.

In various embodiments, processor utilization determination is performed by accessing an application program interface (API) to query the processor regarding a current utilization rate. In certain embodiments, the query may be via an operating system executing on the information handling system. In will be appreciated that other methods may be used for determining processor utilization.

In various embodiments, data structures may be generated and/or accessed to support obtaining historical tracking information (e.g., date and/or time stamped tracking information). In various embodiments, the historical tracking information can include computing averages of utilization rates over programmable time periods. In certain embodiments, the data structures may be stored in memory, non-volatile storage, and/or transmitted across a network or shared with another process or thread.

In various embodiments, the partition optimization operation queries a basic input output system (BIOS) of the information handling system. In certain embodiments, the queries into the BIOS are performed via web based enterprise management operation such as a Windows Management Instrumentation (WMI) operation and/or a System Management Interrupt (SMI) operation. In certain embodiments, the queries into the BIOS determine the currently configured compute unit partitioning scheme (e.g., is Hyper Threading enabled or disabled?).

In various embodiments, the information handling system 100 provides support for partitioning by signaling the BIOS of the information handling system. In certain embodiments, the support is provided via libraries provided with the information handling system. In certain embodiments, the signaling is provided via SMI calls to the BIOS through a device driver such as the I/O control (IOCTL) device driver available with certain information handling systems provided by Dell Technologies. In certain embodiments, the signaling can also adjust core counts as well as toggling Hyper Threading.

Figure 4A:
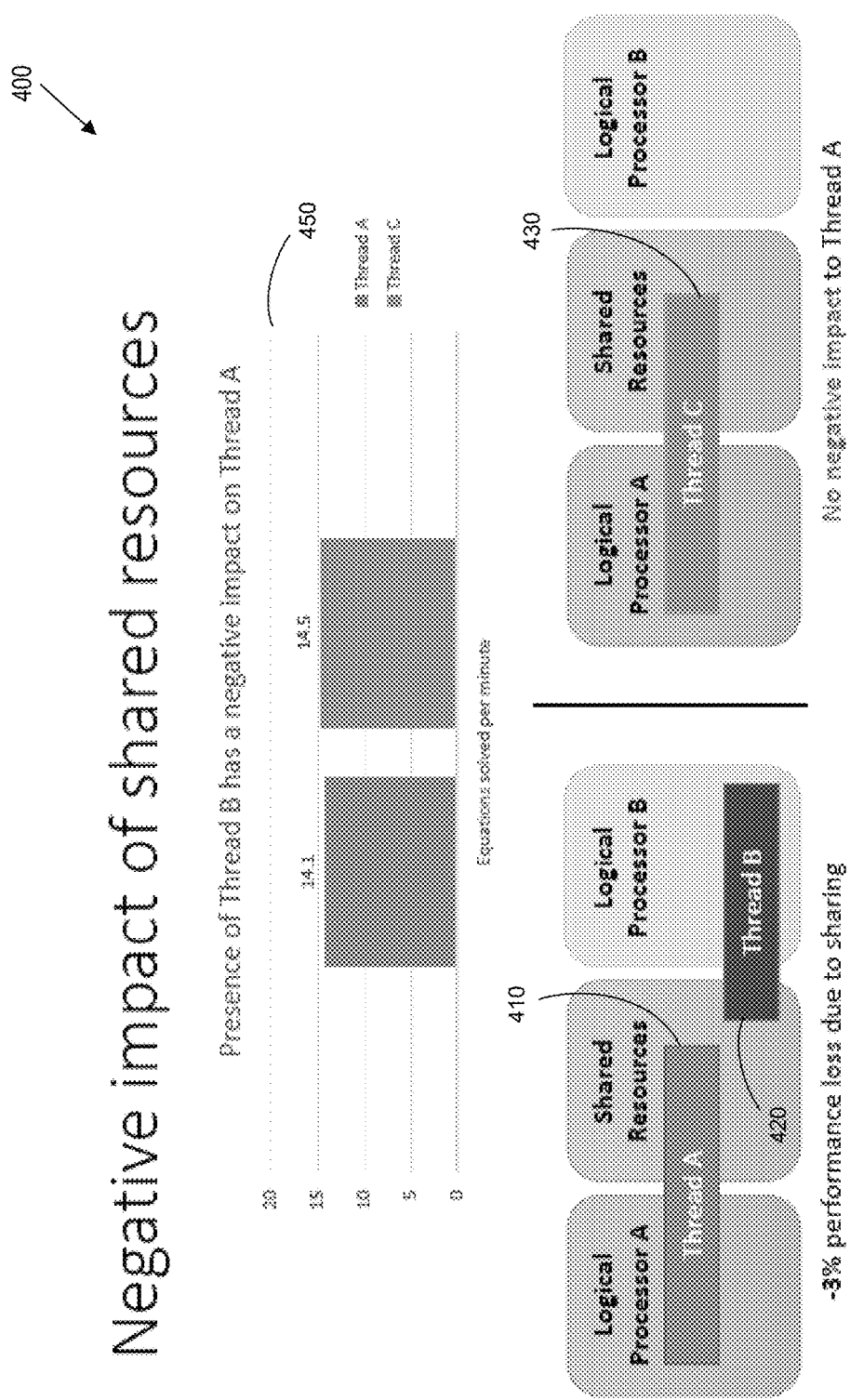
FIGS. 4A and 4B, generally referred to as FIG. 4, show block diagrams representing part of the analysis when determining partitioning compute units.
Figure 4B:
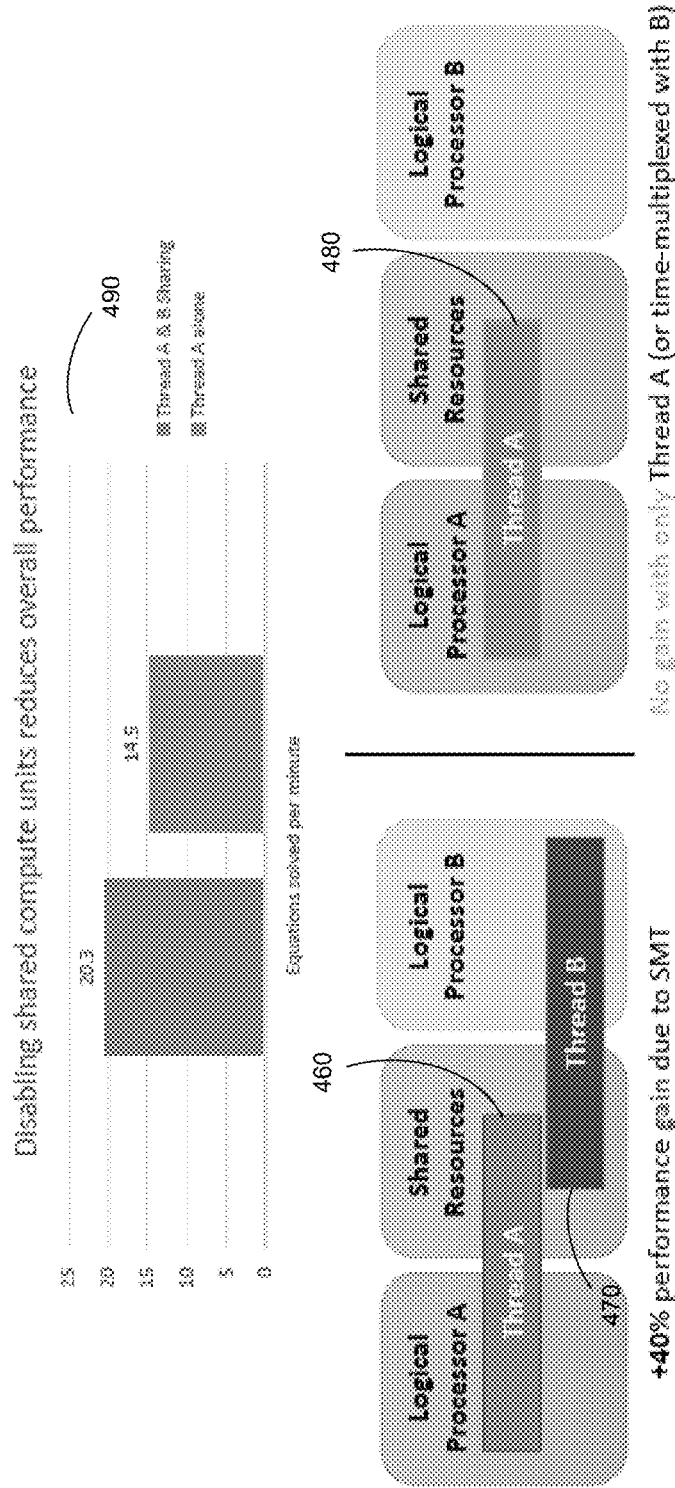

FIGS. 4A and 4B, generally referred to as FIG. 4, show block diagrams representing part of the analysis when determining partitioning compute units. More specifically, FIG. 4A shows an example of how threads using shared resources can have a negative impact on performance of the processor when executing the threads. FIG. 4B shows an example of how disabling shared compute units can have a negative impact on performance of the processor.

More specifically, with the example 400 shown in FIG. 4A, Thread A executes on logical processor A and utilizes the shared resources by a first amount (as indicated by the thread extending into the shared resources to point 410). Thread B executes on logical processor B and utilizes the shared resources by a second amount (as indicated by the thread extending into the shared resources to point 420). Furthering this example, Thread C executes on logical processor A and utilizes the shared resources by a first amount (as indicated by the thread extending into the shared resources to point 430). Thread D executes on logical processor B but does not utilize the shared resources (as indicated by the thread executing completely within logical processor B). In this example, Thread D may not be present and executing at all.

According to the bar chart 400, the compute performance of the processor when executing Threads A and B is 14.1 where the compute performance is solved on a per-minute basis. The compute performance of the processor when executing Thread C is 14.5 where the performance is solved on a per-minute basis. The processor does not experience any performance degradation when executing thread C as compared to a 3% performance loss when executing thread A due to the resource sharing of Threads A and B. Thus, the presence of Thread B has a negative impact on Thread A.

With the example 450 shown in FIG. 4B, Thread A executes on logical processor A, and utilizes the shared resources by a first amount (as indicated by the thread extending into the shared resources to point 460). Thread B executes on logical processor B, and utilizes the shared resources by a second amount (as indicated by the thread extending into the shared resources to point 470). Threads A and B work on the same workload (e.g., evaluating Laplace Equations, Fast Fourier Transforms, Least Sum of squares, Partial Differential Equations, etc.). Furthering this example, Thread A executes on logical processor A and utilizes the shared resources by a first amount (as indicated by the thread extending into the shared resources to point 480) and shared resources are disabled such that no thread can execute on logical processor B.

According to the bar chart 490, the compute performance of the processor when shared compute units are enabled to execute Threads A and B is 20.3 where the compute performance is solved on a per-minute basis. In certain embodiments, compute performance is calculated using Laplace Equations to perform a Laplace Transform operation (i.e., a frequency-domain approach for continuous time signals) to determine compute performance. The compute performance of the processor shared compute units are disabled when executing Thread A is 14.5 where the performance is solved on a per-minute basis. Thus, the processor experiences a 40% performance gain when shared compute units are enabled.

Figure 5:
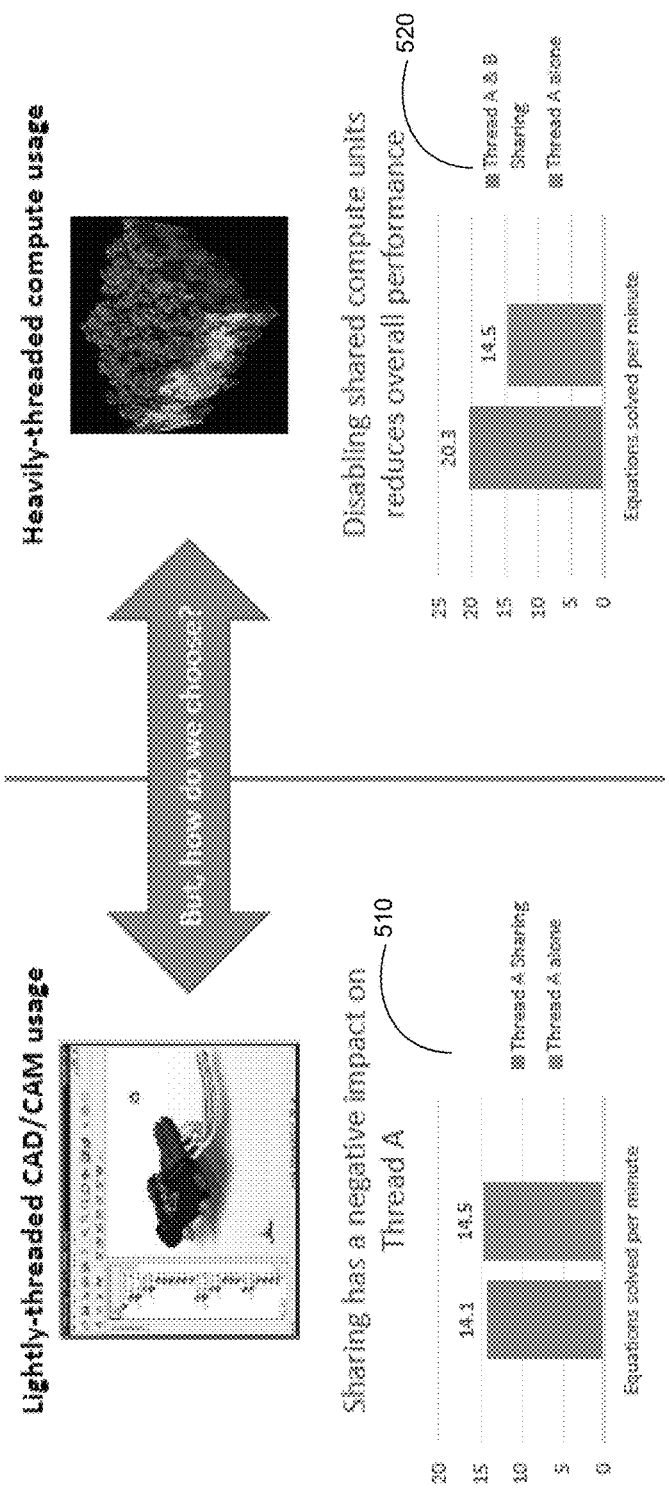
FIG. 5 shows a block diagram representing part of the analysis when determining partitioning compute units.

FIG. 5 shows a block diagram representing part of the analysis when determining partitioning compute units. More specifically, FIG. 5 shows an example of how when maximizing processor performance it is desirable to know when to disable and when to enable when making partitioning decisions. More specifically, example 500 shown in FIG. 5A shows compute performance comparison when executing a lightly threaded application such as a computer aided design (CAD)/computer aided manufacturing (CAM) application to a heavily threaded compute usage. One example of a heavily threaded application includes performing computational fluid dynamics type analyses.

According to the bar chart 510, when executing a lightly threaded application, the compute performance of the processor when sharing compute units is 14.1 where the compute performance is solved on a per-minute basis. The compute performance of the processor when executing solely executing Thread A is 14.5 where the performance is solved on a per-minute basis. Thus, for a lightly threaded application, the use of partition sharing has a negative impact on processor performance.

According to the bar chart 520 with heavily threaded compute usage, the compute performance of the processor when Thread A and Thread B are partitioned to share resources is 20.3 where the compute performance is solved on a per-minute basis. The compute performance of the processor when executing solely executing Thread A is 14.5 where the performance is solved on a per-minute basis. Thus, for heavily threaded compute usage, disabling shared compute units reduces the overall performance of the processor.

Figure 6:
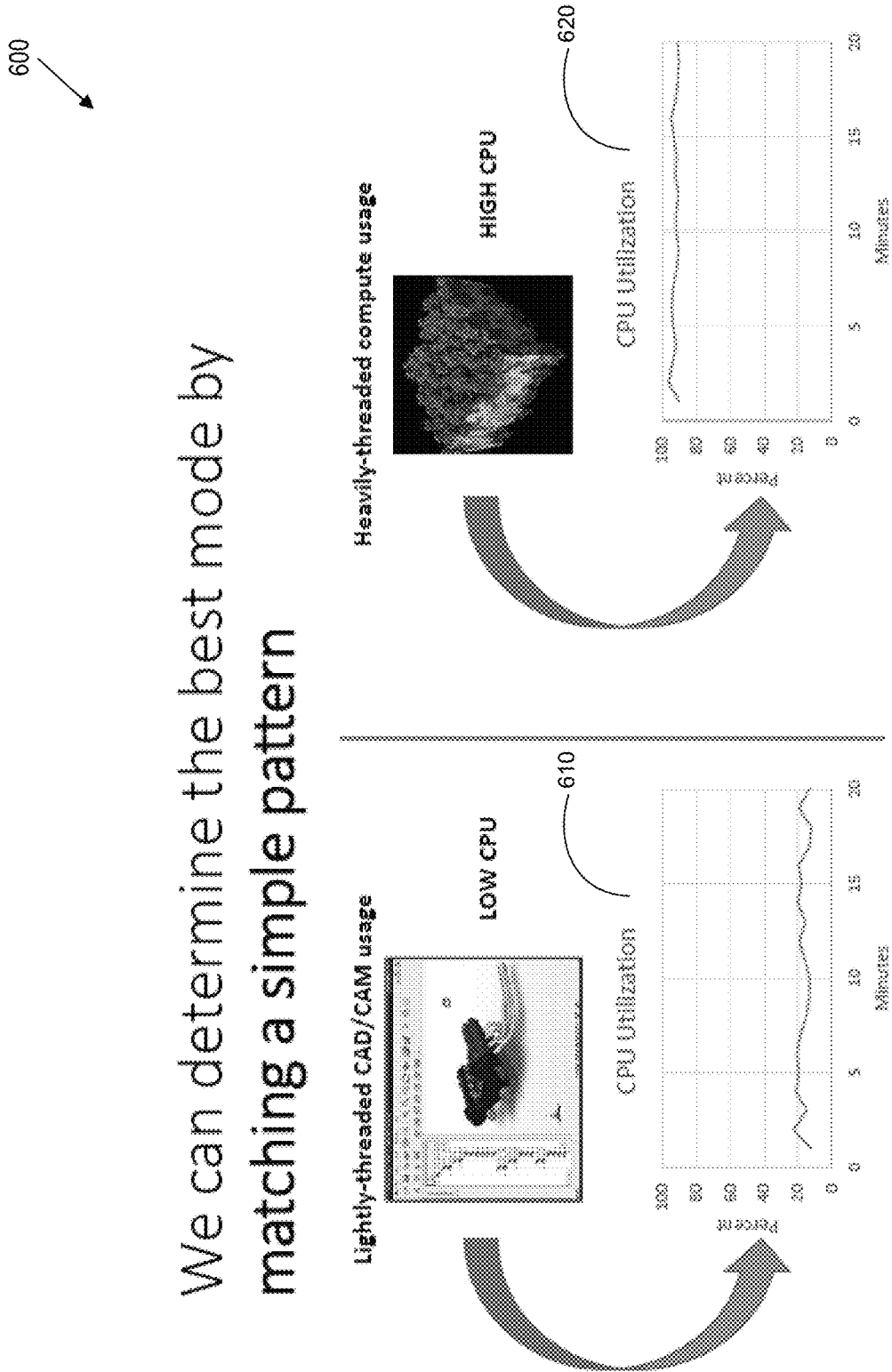
FIG. 6 shows a block diagram representing how differing compute usage affects partitioning when performing a partition optimization operation.

FIG. 6 shows a block diagram representing how differing compute usage affects partitioning when performing a partition optimization operation. More specifically, the partition optimization operation analyzes compute usage over time when making automatic partition decisions. By analyzing compute unit usage over time, the partition optimization operation can determine whether a compute unit is executing a lightly threaded application or heavily threaded compute usage. For example, as shown in graph 610, when the compute usage remains below a predetermined percentage (e.g., below 30%) over a certain amount of time, the partition optimization operation can identify the application as lightly threaded. As shown in graph 620, when the compute usage remains above a predetermined percentage (e.g., above 80%) over a certain amount of time, the partition optimization operation can identify the compute unit usage as heavily threaded.

In certain embodiments, the lightly threaded application can be an application which uses a 3D application program interface (API), such as a CAD/CAM type application. Certain APIs, such as 3D APIs, are used to drive a graphics card and can constrain the relationship to a single thread. With such an application, the most cycles available to send commands and data to the graphic processor is 1/N maximum cycles, where N represents the number of cores in the processor. Heavily threaded compute usage such as computationally heavy applications benefit by partitioning and distributing work across all available resources even if sharing is involved.

Figure 7:
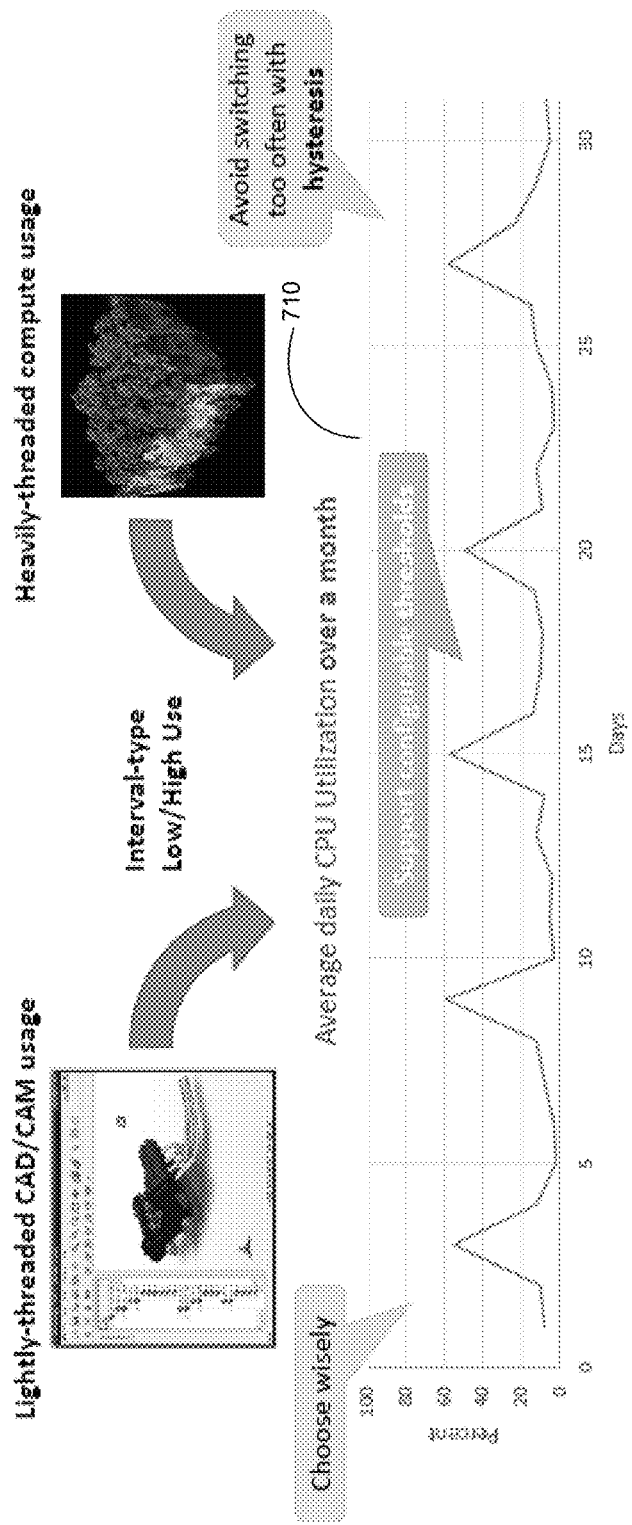
FIG. 7 shows a block diagram representing how mixed use compute usage affects partitioning when performing a partition optimization operation.

FIG. 7 shows a block diagram representing how mixed use compute usage affects partitioning when performing a partition optimization operation. In an example of mixed use modeling, the shape of a certain device made of a certain material (e.g., a helmet made of a certain type of plastic), the modeler might spend 20% of their time modeling the helmet, then spend 40% of their time running solvers to compute the deformation of the helmet when it hits an immovable item (e.g., a telephone pole) at a certain speed (e.g., 15 mph) while being worn by a certain user (e.g., a 10-year-old boy's head). Because the usage is mixed, even within the same application, the modeler would weigh the pros/cons of partitioning because in this example partitioning would help one usage but potentially hurt the other. By providing programmable thresholds, the user can tune the switch such that, if they spend substantially more time (e.g., >80%) in a lightly-threaded interactive use case (e.g., modeling the helmet), and only a small amount of time (e.g., >20%) in the compute-intensive simulation (e.g., computing the deformation), then the user might wish to favor disabling partitioning. The thresholds provide both a fuzziness/tenability function as well as a hysteresis function. Another example of mixed compute usage is video editing. Editing video footage might be a lightly threaded application, whereas encoding the video to use might be a heavily threaded compute usage.

More specifically, the partition optimization operation analyzes compute usage over time when making automatic partition decisions. By analyzing compute unit usage over time, the partition optimization operation can determine whether a compute unit is executing a combination of lightly threaded applications and heavily threaded compute usage. For example, as shown in graph 710, when the compute usage is variable over a certain amount of time, the partition optimization operation can identify the application as mixed use. When identifying the compute usage variable, the partition optimization system 210 includes a plurality of features to determine which is the optimal partition decision. For example, in certain embodiments, the partition optimization system 210 provides support for configurable thresholds. Examples of configurable thresholds include PD: 0, PE: 100, which effectively disable the switching mechanism, because utilization will never be less than zero or greater than 100; PD: 100, PE: 0—highly volatile; which would disable partitioning on every subsequent reboot, and enable partitioning again immediately thereafter; PD: 5, PE: 10, which would provide highly invariant partitioning such that most of the time partitioning is enabled; PD: 100, PE: 100 would provide highly invariant partitioning such that most of the time partitioning is disabled; PD: 50, PE: 50 would provide a stable but still varying setting where, if not using the partitioned resources, partitioning would be disabled, but if resource utilization exceeds 50% of the resources when the resources aren't partitioned, partitioning would be enabled; PD: 50, PE: 80 would provide a more stable but slightly varying setting where, once partitioning is disabled, a much higher utilization would be needed to trigger enablement again.

Additionally, in certain embodiments, the partition optimization system 210 includes providing hysteresis function. In certain embodiments, the hysteresis function is provided by one or more of the PD thresholds, the PE threshold, and the sampling intervals. For example, spacing the sampling intervals out over a relatively long period of time (e.g., hundreds of hours) before evaluating whether to make a partitioning change, provides a significant amount of hysteresis because the analysis would require more PD threshold excursions and/or PE threshold excursions to trigger a change. Alternately for example, if the intervals are relatively short (e.g., a few minutes long), and the PD threshold and/or PE threshold are highly volatile, the disable/enable partitioning could change constantly within a single day.

Figure 8:
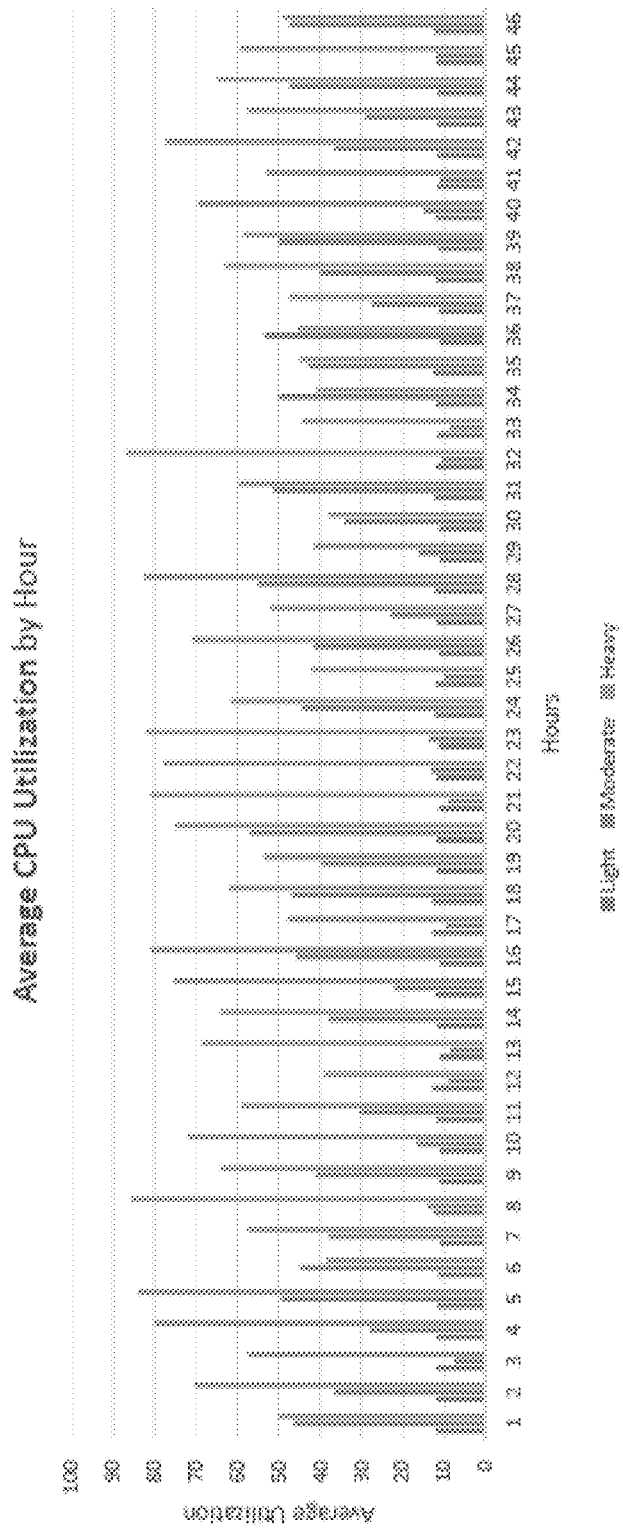
FIG. 8 shows a chart representing an example comparison of how different uses might affect compute usage.

FIG. 8 shows a chart representing an example comparison of how different uses might affect compute usage. In this comparison, the partition optimization system 210 easily identifies light users, and the partition optimization operation can identify which compute units should not be partitioned because the increase in compute units would not be exercised by the user. The partition optimization system 210 also easily identifies a heavy user by the frequent intervals above 50% utilization. For a moderate user, the partition optimization system 210 would use programmable thresholds to determine when to partition the compute units. A moderate user (e.g., a user who occasionally uses heavy compute resources) (favoring partitioning enabled) but most of the time is lightly loading the processor (favoring partitioning disabled), can use the programmable thresholds to customize the sensitivity of the PD threshold and/or the PE threshold to triggering a partition change. For example, the user might start with PD:50 and PE:50, but find that the partitioning setting is changing too often, so the user might instead set the thresholds to PD:50 and PE:80. Alternatively, the user could increase the N-width intervals or M intervals of utilization time to reduce the frequency at which the PD/PE thresholds are evaluated.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an automatic partition optimization operation on a processor, comprising:
monitoring compute unit usage of the processor over time;
determining whether an application executing on the processor comprises a lightly threaded application or a heavily threaded application, a lightly threaded application corresponding to a percentage of processor usage below 30 percent, a heavily threaded application corresponding to the percentage of processor usage above 50 percent;
determining whether the application executing on the processor results in a mixed use compute usage;
providing programmable thresholds for use when adjusting compute unit partitioning, the programmable thresholds providing a tenability function and a hysteresis function when adjusting compute partitioning of processor; and,
automatically adjusting compute unit partitioning of the processor based upon whether the application executing on the processor comprises the lightly threaded application or the heavily threaded application.

2. The method of claim 1, wherein:
for lighter threaded compute unit usage, the compute units are automatically partitioned to maximize performance by eliminating conflicts due to resource sharing.

3. The method of claim 1, wherein:
for heavily threaded compute unit usage, the compute units are partitioned to maximize symmetric multi-processing capabilities.

4. The method of claim 1, wherein:
the determining whether an application executing on the processor comprises a lightly threaded application or a heavily threaded application comprises identifying a percentage of processor usage.

5. The method of claim 4, wherein:
the percentage of processor usage is analyzed across a plurality of regular time intervals.

6. The method of claim 1, further comprising:
querying a basic input output system (BIOS) to determine a currently configured compute unit partitioning scheme.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
monitoring compute unit usage of the processor over time;
determining whether an application executing on the processor comprises a lightly threaded application or a heavily threaded application, a lightly threaded application corresponding to a percentage of processor usage below 30 percent, a heavily threaded application corresponding to the percentage of processor usage above 50 percent;
determining whether the application executing on the processor results in a mixed use compute usage;
providing programmable thresholds for use when adjusting compute unit partitioning, the programmable thresholds providing a tenability function and a hysteresis function when adjusting compute partitioning of processor; and,
automatically adjusting compute unit partitioning of the processor based upon whether the application executing on the processor comprises the lightly threaded application or the heavily threaded application.

8. The system of claim 7, wherein:
for lighter threaded compute unit usage, the compute units are automatically partitioned to maximize performance by eliminating conflicts due to resource sharing.

9. The system of claim 7, wherein:
for heavily threaded compute unit usage, the compute units are partitioned to maximize symmetric multi-processing capabilities.

10. The system of claim 7, wherein:
the determining whether an application executing on the processor comprises a lightly threaded application or a heavily threaded application comprises identifying a percentage of processor usage.

11. The system of claim 10, wherein:
the percentage of processor usage is analyzed across a plurality of regular time intervals.

12. The system of claim 7, wherein the instructions are further configured for:
querying a basic input output system (BIOS) to determine a currently configured compute unit partitioning scheme.

13. A non-transitory, computer-readable storage medium embodying computer program code, the computer program code comprising computer executable instructions configured for:
monitoring compute unit usage of a processor over time;
determining whether an application executing on the processor comprises a lightly threaded application or a heavily threaded application, a lightly threaded application corresponding to a percentage of processor usage below 30 percent, a heavily threaded application corresponding to the percentage of processor usage above 50 percent;
determining whether the application executing on the processor results in a mixed use compute usage;
providing programmable thresholds for use when adjusting compute unit partitioning, the programmable thresholds providing a tenability function and a hysteresis function when adjusting compute partitioning of processor; and,
automatically adjusting compute unit partitioning of the processor based upon whether the application executing on the processor comprises the lightly threaded application or the heavily threaded application.

14. The non-transitory, computer-readable storage medium of claim 13, wherein:
for lighter threaded compute unit usage, the compute units are automatically partitioned to maximize performance by eliminating conflicts due to resource sharing.

15. The non-transitory, computer-readable storage medium of claim 13, wherein:
for heavily threaded compute unit usage, the compute units are partitioned to maximize symmetric multi-processing capabilities.

16. The non-transitory, computer-readable storage medium of claim 13, wherein:
the determining whether an application executing on the processor comprises a lightly threaded application or a heavily threaded application comprises identifying a percentage of processor usage.

17. The non-transitory, computer-readable storage medium of claim 16, wherein:
the percentage of processor usage is analyzed across a plurality of regular time intervals.

18. The non-transitory, computer-readable storage medium of claim 13, wherein the instructions are further configured for:
querying a basic input output system (BIOS) to determine a currently configured compute unit partitioning scheme.

* * * * *